Aug. 18, 1931.  R. A. CLAPP  1,819,593
CAMERA
Filed Dec. 1, 1927  3 Sheets-Sheet 2

Inventor
Royal A. Clapp,
by Harold J. Clark
Attorney

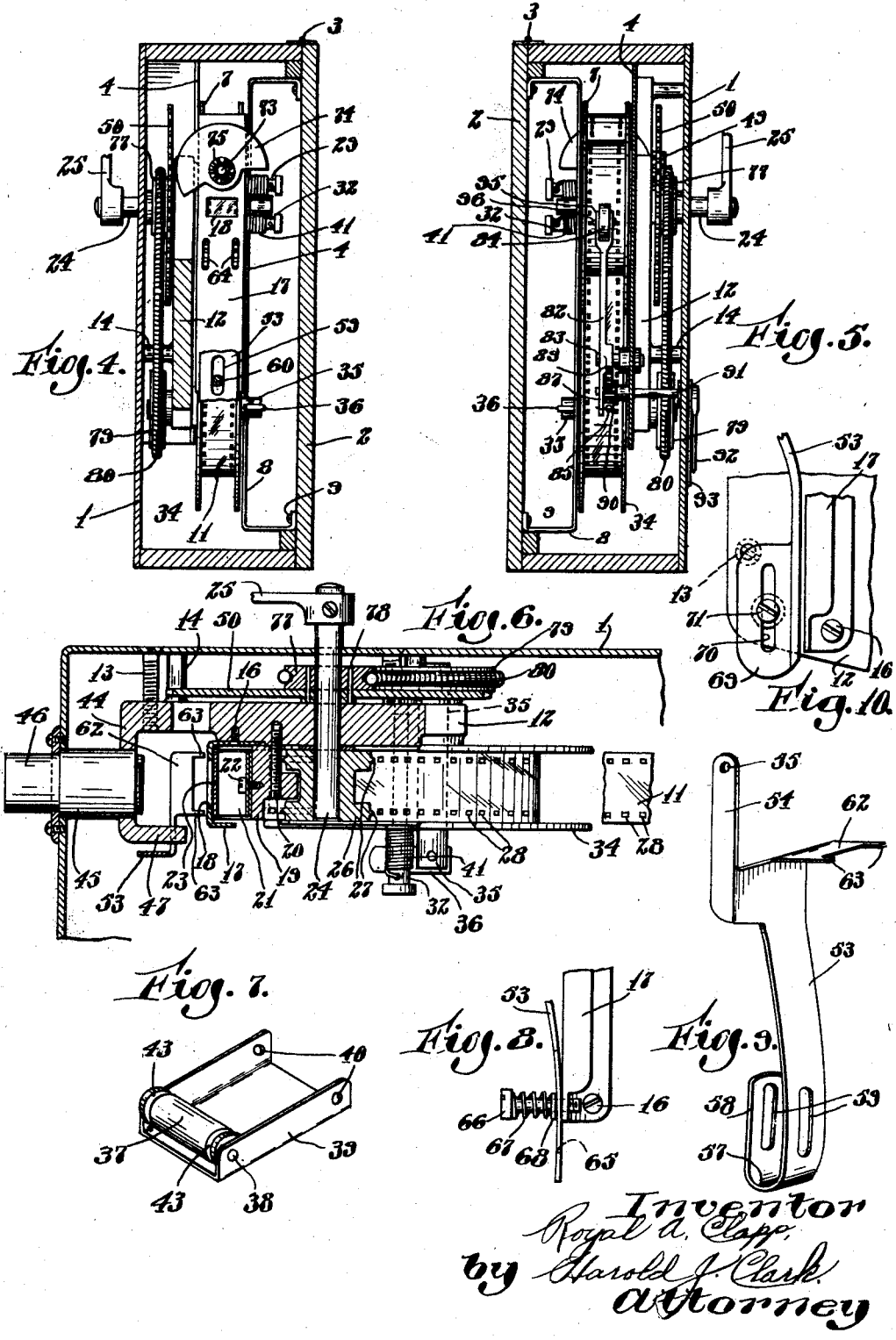

Patented Aug. 18, 1931

1,819,593

UNITED STATES PATENT OFFICE

ROYAL A. CLAPP, OF BROOKLINE, MASSACHUSETTS

CAMERA

Application filed December 1, 1927. Serial No. 237,028.

The present invention relates to cameras, and more particularly to cameras for the taking of pictures in continuous sequence, such as moving pictures.

An important object of the present invention is to produce a moving picture camera which will be economical to manufacture, simple to operate and manipulate, and which will be sturdy and durable.

Another object is the provision of novel means to positively feed the film through the camera in an intermittent or step-by-step movement in synchronism with the operation of the shutter.

A further object is the provision of means to indicate, externally of the machine, the number of feet of film remaining on the reel from which the unexposed film is being unwound.

Another object is the provision of novel means to retain the film in contact with the sprockets or feeding devices, insuring positive movement of the film during the operation of the camera. This last named means comprises a pair of rollers, preferably of rubber or similar material, each provided with a pair of bifurcations to accommodate the teeth of the sprockets. These rollers are mounted in frames which in turn are under spring pressure or tension, thus insuring constant pressure of the rollers against the film, and of the film against the sprockets.

A further object of the invention is the provision of means on one side of the camera casing, which side is adapted to open to permit removal and replacement of the film reels and for other purposes, to cooperate with means on the interior of the casing to retain the unwinding film at all times in correct alinement, and to prevent tilting or wabbling thereof.

These and further objects of the invention, details of construction, combinations of parts and advantages, will be hereinafter more fully pointed out and claimed.

Referring to the drawings, illustrating the preferred embodiment of the present invention, Fig. 1 is a side elevation of my novel camera, with one side thereof in open position;

Fig. 4 is a cross-sectional view on the line 4—4 of Fig. 2;

Fig. 5 is a cross-sectional view on the line 5—5 of Fig. 3;

Fig. 6 is a cross-sectional view on the line 6—6 of Fig. 2;

Fig. 7 is a perspective view of one of the members for holding the film in contact with the feeding means;

Fig. 8 is a fragmentary detail, on an enlarged scale, of a modification;

Fig. 9 is a perspective view, on an enlarged scale, of the step-by-step film feeding member; and Fig. 10 is a perspective view, on an enlarged scale, of a modification.

Figure 1:
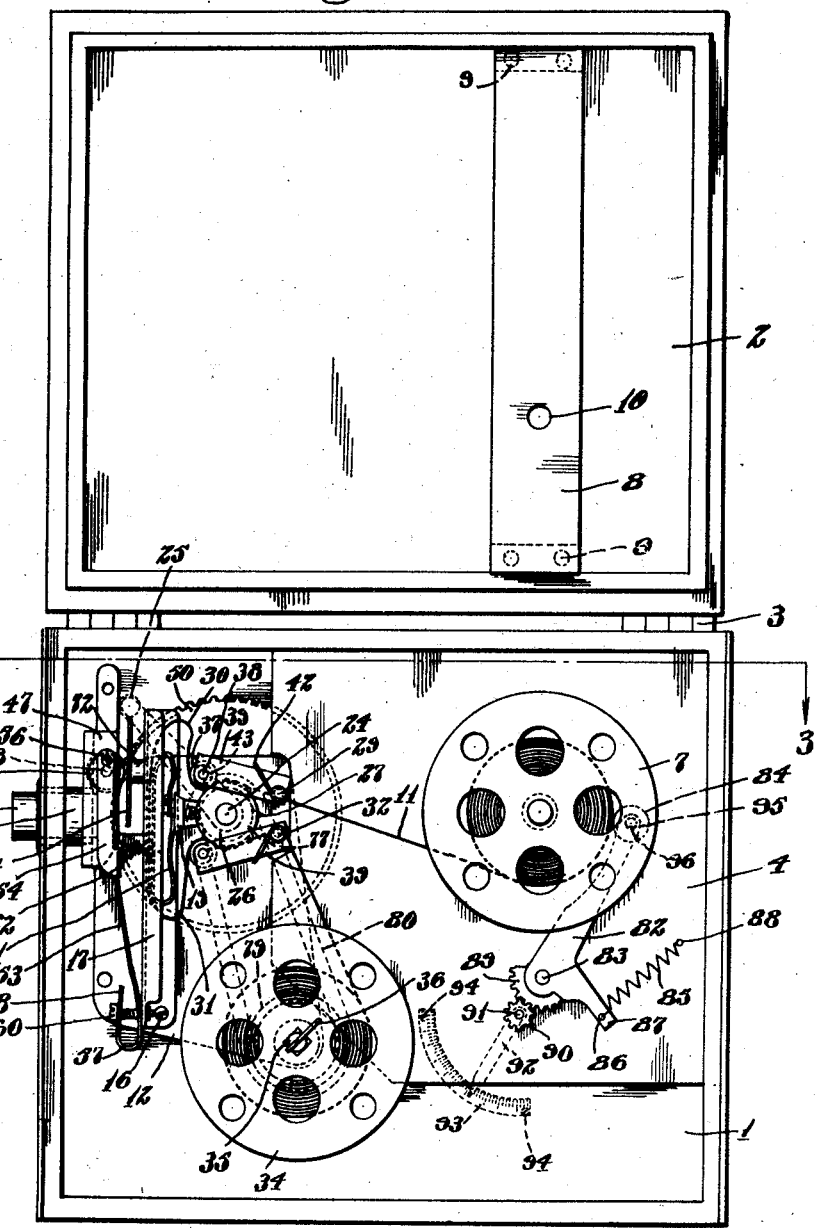

Referring now to the drawings, for a detailed description of my novel camera and the method of operating the same, 1 designates a casing, having a side 2 hinged at 3 and adapted to be swung open to permit access to the interior of the machine. Within the casing 1 is positioned a plate 4 through which extends a stud 5, preferably round, and terminating in a reduced end 6. A film holding reel 7 is mounted for rotation on the reduced end 6 of the stud 5, and is maintained in alinement by the plate 4, and by a strap or brace 8 secured to the side 2 by screws 9, said strap having an aperture or recess 10 therein to accommodate the end 6 of the stud 5. On the reel 7, and adapted to be unwound therefrom, is a film 11. This film is subjected to a series of intermittent exposures, after which it is developed and is then ready for projection from a suitable projecting machine, preferably of the type illustrated and described in my copending application Ser. No. 239,175, filed Dec. 10, 1927.

Mounted within the casing 1 is a plate or casting 12, secured to the casing by screws 13 and spaced from the side of the casing by lugs 14. One end of the plate 4 rests on this casting 12, the other end of the plate 4 being spaced an equal distance from the side of the casing by a flange 15. Affixed to the casting 12 by screws 16 is a member or plate 17 having a photographic aperture 18 therein. On the casting 12 is a boss 19, either formed as an integral part of the casting, or secured thereto by a screw 20, as shown, and affixed to said boss by a screw 22 is a spring 21 having a flat portion 23 adapted to bear against the inner or rear surface of the member or plate 18, particularly in back of the aperture 18. A shaft 24 extends through the casing 12 and to the outside of the casing 1, and on the outer end thereof is affixed an operating handle 25. On the inner end of the shaft 24 is mounted for rotation therewith a sprocket 26 having a plurality of minute teeth 27 adapted to mesh with the holes 28 along each edge of the film 11. The film 11, when being fed through the machine preliminary to being exposed, is led from the reel 7 under the pin 29 and over the sprocket 26, the teeth 27 meshing with the holes or perforations 28. The film is then fed through a gate, comprised of the plate 17 and flat portion 23 of the spring 21, in such manner and position that a predetermined portion of said film is exposed to the aperture 18, a free loop 30 being left to permit proper feeding movement of the film 11 past said aperture. The film then passes under the lower end of the spring 21, a free loop 31 being provided at this portion, and is then led up to the sprocket 26, the teeth 27 again engaging the perforations 28. Thence the film is led over the pin 32 and to the hub 33 of a reel 34, mounted on a square stud 35 on the outer end of which is provided a member 36 to hold said reel in position thereon. In order to hold the film firmly against the sprocket 26, both top and bottom, to permit and insure positive feeding thereof, I provide a pair of bifurcated rollers 37, mounted on pins 38 in frames 39 provided with apertures 40. These frames are pivotally mounted, by means of the apertures 40, on the pins 29 and 32. On the outer end of each pin 29 is a coiled spring 41 having an arm 42 adapted to bear against each frame 39 to force the rollers 37 against the film 11 and hence holding the film in firm engagement with the sprocket 26.

Each roller 37 has a pair of bifurcations 43 to accommodate the teeth 27 on the sprocket 26. By thus pivoting the frames 39 on the pins 29 and 32, they may be raised against the tension of the springs 41 to permit feeding of the film through the machine. When the end of the film 11 has been secured to the hub 33 of the reel 34, the side 2 is closed and the camera is then ready to be operated to take any desired picture or series of pictures.

While I have illustrated the reels 7 and 34 as "open" reels, viz., with apertures in the side thereof, it will be appreciated that when the camera is to be utilized "on the job", closed reels, or reels having solid sides to prevent the entrance of light would be utilized, the reels illustrated herein being practical for use when there is a dark room for removing and replacing film in the camera.

The front end of the casting 12 is upturned, as shown at 44 and to this upturned portion is affixed a lens barrel 45 in any desirable manner, this lens barrel projecting beyond the front of the casing 1 as shown at 46. The upturned end 44 of the casting 12 is provided with a flange 47 and mounted for rotation in the casting 12 and flange 47 is a shaft 48. On one end of the shaft 48, and preferably below the casting 12, is a pinion 49 engaged by a gear 50 affixed to the shaft 24 and adapted to be rotated on rotation of the handle 25. Affixed to the end of the shaft 48 opposite the pinion 49, is an eccentric 51 having a lug 52 to space the eccentric from the flange 47.

It will be understood, of course, that the film 11 must be fed past the aperture 18 in an intermittent, or step-by-step movement, since the film is divided into predetermined spaces, on each of which spaces is to be received the picture or impression to which each space is exposed. In order to provide for an efficient and positive step-by-step movement, I have devised the novel means illustrated herein, which consists in a feeding member comprising a body portion 53 from which extends an arm 54 having an aperture 55 adjacent to the outer end thereof, and by means of which aperture the arm 54 is united with the eccentric 51, a screw 56 effecting the union.

The end of the feeding member opposite the arm 54 is formed U-shaped, as illustrated at 57, and in the body portion 53 and portion 58 are formed a pair of elongated slots 59. Through these slots 59 extends a bolt 60, which also extends through an aperture in the lower end of the member 17, the nut 61 being provided to adjust the relation of the portion 58 with the body portion 53, for proper tension. The feed member being constructed of spring metal, it will provide its own tension. This construction maintains the lower end of the feeding member in a fixed sliding relation with the member 17 so that the lower end of the feeding member will also be in a fixed position. Projecting from the body portion 53 is a plate 62 provided with a pair of claws or prongs 63. As the eccentric 51 rotates, therefore, the prongs 63 will be moved into and along and out of the slots 64. As the prongs 63 move into the slots 64, they will engage the apertures 28 in the edges of the film, at the top of the slots 64, and on continued rotation of the eccentric 51, the prongs 63 will be forced downwardly, moving the film 11 a predetermined distance, viz., one of the above mentioned spaces.

In Figs. 8 and 10 are illustrated modifications of the means to hold the lower end of the feeding member in position. In Fig. 8 the lower end of the body portion 53 is not formed U-shaped, but is merely provided with a single elongated slot 65 through which passes a screw 66, a spring 67 and washer 68 serving to exert tension against the lower end of the body 53 to hold same against the lower end of the member 17.

In Fig. 10 the lower end of the body 53 has formed thereon a plate 69 which has an elongated slot 70 to permit sliding of the plate 69, and hence the feeding member, guided by the screw or stud 71. This last described construction is desirable, since it eliminates any "jumping" or unevenness of operation which might be caused by utilization of the spring mechanism.

It will be understood that after an exposure of one section of the film has taken place, means must be provided to prevent the entrance of light to the film while that portion of the film which has been exposed is being moved from position behind the photographic aperture and a new unexposed portion is being positioned. In the present machine I provide means for accomplishing this result as follows:

A boss 72 affixed to the member 17 has a stud 73 projecting therefrom, and on this stud is rotatably mounted a shutter 74 provided with a cut-away portion, as clearly illustrated in Fig. 4. Affixed to the shutter 74 is a beveled pinion 75 adapted to rotate the shutter 74 when rotation is imparted to the pinion 75 by a similar beveled pinion 76 on the shaft 48. Since the eccentric 51, controlling the actuation of the feeding prongs 63, is rotated by the same shaft 48, it will be understood that the shutter 74 will rotate in unison with the eccentric 51. The rotation of the shutter 74 past the photographic aperture 18, is also synchronized with the movement of said feeding prongs 63, in such manner that the open portion of the shutter will permit the entrance of light through the lens to the film while the prongs 63 are disengaged from said film. As soon as the prongs 63 engage the film, however, the shutter 74 will shut off the light through the aperture 18, permitting the exposed portion of the film to be moved out of alinement with the aperture, and a new unexposed portion moved into alinement with said aperture. Thereupon, the open portion of the shutter will again be alined with the aperture 18, permitting exposure of the next succeeding portion of the film.

Thus it will be appreciated that the feeding of the film from the reel 7 over the sprocket 26 is a steady movement, while the feeding of the film through the gate and past the photographic aperture 18, is an intermittent or step-by-step movement. Thus the loop 30 of free film, above the gate, permits this variation in movements without exerting a strain or undue tension on the film.

In order to effectually and positively wind the exposed film on the reel 34, I provide, on the shaft 24, a grooved disc 77 affixed to the gear 50 by pins 78 or the like. To the stud 35 is affixed a larger grooved disc 79, and running in the grooves of the discs 77 and 79, is a spring belt 80. Thus, rotation of the shaft 24 will cause rotation of the disc 77, and, through the medium of the spring belt or drive 80, rotation of the disc 79 and hence of the stud 35 and reel 34. The disc 79 will rotate the reel 34 sufficiently fast to constantly take up the exposed film after it has passed the sprocket 26. However, the spring belt or drive 80 will permit slippage on the discs 77 and 79, so that there will never be sufficient tension or strain to cause injury to the film in this feeding.

Thus, from the above, it will be understood that the first movement imparted to the film is a steady movement, then an intermittent or step-by-step movement as the film passes through the gate and past the photographic aperture, and then a steady movement as it again engages the sprocket 26, and another steady movement on the reel 34. All these cooperate to produce an extremely efficient camera, and one in which there will be no "jumping", excessively fast speeding, or similar troubles.

Figure 2:
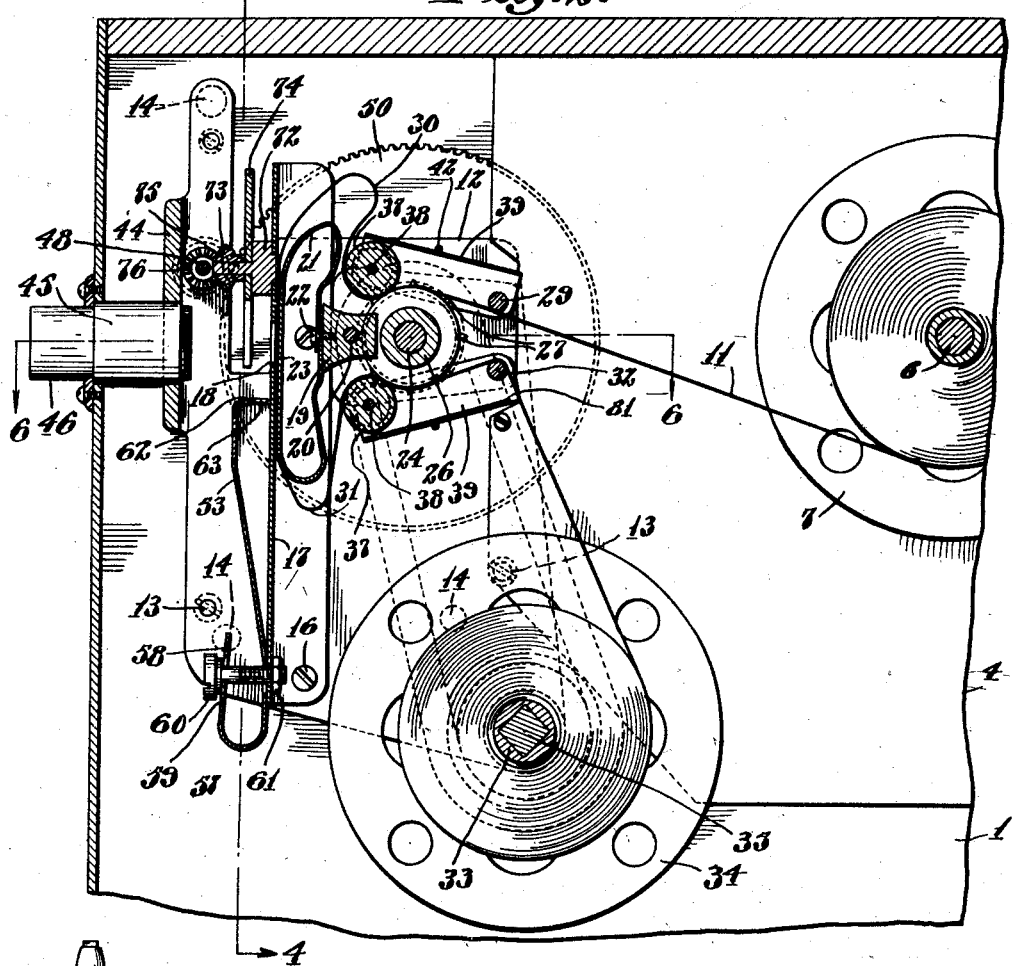
Fig. 2 is a cross-sectional view, on an enlarged scale, on the line 2—2 of Fig. 3.
Figure 3:
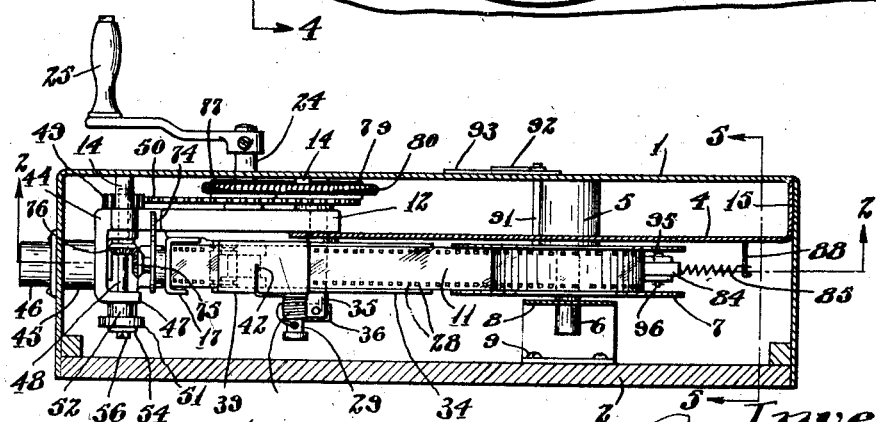
Fig. 3 is a cross-sectional view on the line 3—3 of Fig. 1.

As the film passes over the pin 32 on its way to the winding reel 34, I have cut away the lower frame 39, as illustrated at 81, Fig. 2, in order to prevent scratching of the film 11.

I have also provided novel means to indicate, externally of the machine, the amount of footage remaining on the unwinding reel 7. This means comprises a lever 82, pivotally mounted at 83, and having, on its outer end, a roller 84 adapted to bear against the film on the reel 7. A spring 85 is affixed at one end at 86 to an arm 87 of the lever 82 and at its other end to a pin 88 on the plate 4. Affixed to one end of the lever 82 is a rack or segment 89 meshing with a pinion 90 mounted on a shaft 91 extending to the outside of the case 1, said shaft having, on its outer end, a hand or indicator 92. Also, affixed to the exterior of the casing 1 by screws 94 is a gauge or graduated plate 93 with which the indicator 92 cooperates.

Thus, the spring 85 constantly tends to keep the roller 84 in contact with the film 11 on the reel 7. As the supply of film on said reel diminishes, the lever 82 will necessarily be moved toward the center of the reel, rotating the segment 89 and hence the pinion 91, indicating, through the medium of the indicator 92 on the gauge 93 the amount of footage remaining on the reel 7. Since this film is very carefully and uniformly calibrated, this footage will be indicated within very close approximations. The outer end of the lever 82 is yoked, as shown at 95, and the roller 84 is retained in position and rides on a pin 96.

The operation of my present novel camera is simple and easily understood, being briefly summarized as follows:

The side 2 of the camera is swung open and a reel 7 having unexposed film 11 thereon is mounted on the stud 5. The film 11 is then fed under the pin 29 and over the sprocket 26, the upper roller 39 being raised to permit passage of the film thereunder. It is then fed through the gate, comprising the spring 23 and plate 17, behind the aperture 18, a free loop 30 being left above the gate. A free loop 31 is left below the gate and the film 11 is then fed over the lower roller 37 and under the sprocket 26, thence over the pin 32 and to the winding reel 34. The side 2 is then closed, and the camera is ready to operate. Manipulation of the handle 25 will then rotate the shaft 24, causing rotation of the sprocket 26 and a constant feed of the film 11 toward the gate. Rotation of the shaft 24 will also rotate the gear 50, and pinion 49, rotating the shaft 48 and eccentric 51. This rotation of the eccentric 51 will cause actuation of the film feeding member 53, intermittently bringing the prongs into engagement with the perforations 28 in the edges of the film 11 and moving said film through the gate and past the aperture 18 in an intermittent or step-by-step movement, the sprocket 26 then feeding the film in a steady or constant movement toward the rewinding reel, the spring belt or drive 80 actuating this rewinding reel also in a steady movement, permitting slippage thereof if the tension becomes too great. Simultaneously with rotation of the eccentric 51, the beveled pinion 76 will rotate the pinion 75 and shuter 74, in synchronism with the feeding of the film, as above explained. As the film is being taken from the reel 7, the amount of footage remaining on said reel will be constantly indicated to the operator externally of the machine, thus resulting in apprising the operator in ample time to prepare for refilling the camera.

It will thus be seen that I have devised a simple, efficient and positively acting moving picture camera, and one which I believe to be novel and have therefore claimed broadly in the present application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a camera, a film holding reel, a film having perforations in its edges, a member having a photographic aperture therein, an eccentric, means to rotate said eccentric, a member connected at its upper end to said eccentric, said member being slidably mounted at its lower end, a lip extending laterally of said member intermediate the upper and lower ends thereof, and prongs on said lip adapted to engage said perforations and move said film past said aperture in a step-by-step movement.

2. In a camera, a film holding reel, a film having perforations in its edges, a member having a photographic aperture therein, an eccentric, means to rotate said eccentric, a member connected at its upper end to said eccentric, said member being slidably mounted at its lower end, a lip extending laterally of said member intermediate the upper and lower ends thereof, prongs on said lip adapted to engage said perforations and move said film past said aperture in a step-by-step movement, and a shutter, operated by said eccentric rotating means in synchronism with said prongs to cover said aperture at predetermined intervals.

3. In a camera, a film holding reel, a film having perforations in its edges, a member having a photographic aperture therein, an eccentric, a shaft on which said eccentric is mounted, means to rotate said shaft, a member connected at one end to said eccentric, said member being slidably mounted at its other end, prongs extending laterally of said member intermediate the upper and lower ends thereof adapted to engage said perforations and move said film past said aperture in a step-by step movement, a shutter, a pinion on said shutter, and a pinion on said shaft meshing with the pinion on said shutter, whereby said shutter will be operated in synchronism with said prongs to cover said aperture at predetermined intervals.

In testimony whereof, I have signed my name to this specification.

ROYAL A. CLAPP.